United States Patent

[11] 3,624,565

[72] Inventors Samuel Harris
Cherry Hill;
Edward C. Horton, Cherry Hill, N.J.; Otto P. Tader, Chicago, Ill.

[21] Appl. No. 873,549
[22] Filed Nov. 3, 1969
[45] Patented Nov. 30, 1971
[73] Assignee TRW Inc.
Cleveland, Ohio

[54] TOROIDAL FILTER
3 Claims, 3 Drawing Figs.

[52] U.S. Cl. .......... 333/76, 333/70 S, 333/77
[51] Int. Cl. .......... H03h 7/08
[50] Field of Search .......... 333/70 S, 76, 77

[56] References Cited

UNITED STATES PATENTS

| | | | |
|---|---|---|---|
| 2,872,649 | 2/1959 | Boothe | 333/70 S |
| 3,247,475 | 4/1966 | Buetow et al. | 333/76 X |
| 3,267,396 | 8/1966 | Scott | 333/76 X |

FOREIGN PATENTS

| | | | |
|---|---|---|---|
| 974,665 | 11/1964 | Great Britain | 333/70 S |

*Primary Examiner*—Herman Karl Saalbach
*Assistant Examiner*—Saxfield Chatmon, Jr.
*Attorney*—Hill, Sherman, Meroni, Gross & Simpson

ABSTRACT: Filter assembly particularly useful as an intermediate frequency filter for FM radios, the filter including a nonmagnetic form having a plurality of toroidally wound cores positioned in spaced coaxial relation along the form, with a capacitance for each of the coils providing a tuned circuit at a predetermined frequency, the spacing between the coils being sufficiently close so that stray capacitances between the coils are sufficient for coupling the tuned circuits at the operating frequency of the filter.

INVENTORS
Samuel Harris
Edward C. Horton
Otto P. Tader

BY Hill, Sherman, Meroni, Gross & Simpson
ATTORNEYS

TOROIDAL FILTER

BACKGROUND OF THE INVENTION

10 Field of the Invention

This invention is in the field of electrical filters of the tuned circuit type wherein a plurality of coaxially mounted toroidal coils are employed as the inductance elements so that a multipole filter can be physically mounted in a single, small enclosure to provide a filter having band-pass characteristics including a sharp leading and trailing edge frequency response curve and a substantially flat response in between.

2. Description of the Prior Art

Intermediate frequency filters for radios are commonly of the helically wound type which present problems because of the substantial external field generated in their operation, and their susceptibility to stray magnetic fields. As a result, it has become common practice to confine each of the filter elements in its individual metal can for shielding purposes. Such filters also do not always have suitable response characteristics. When a filter is to be employed in a multipole filter system, it is necessary that the leading and trailing edges of the frequency response curve be relatively sharp while the response between the two extremes be relatively flat. Such a problem exists, for example, in the design of FM intermediate frequency filters to be used in the so-called "lumped" systems wherein the selectivity and gain functions of the FM receiver are provided in single lumped elements. It is difficult to construct a filter which has a bandwidth sufficiently wide for stereo reception and still selective enough to reject adjacent stations. The problem then is one of balancing the various factors such as the Q-factor of the coil, the attainment of a suitably wide band-pass characteristic, and the minimizing of insertion losses.

SUMMARY OF THE INVENTION

The present invention provides a compact filter assembly making use of a plurality (preferably 3 or more) of toroidally wound coils, each wound about a core of a ferrite or a similar magnetic material and positioned coaxially along a common coil form in closely spaced relation. A capacitor is provided for each of the coils, providing a tuned circuit of a predetermined frequency with the coil. The coils are preferably separated by a thin, nonmagnetic electrically insulating spacer with a spacing sufficiently close so that stray capacitances between the coils are sufficient for coupling the tuned circuits at the midband frequency of the filter. The spatial arrangement is such that a multipole arrangement can be conveniently contained within a small metallic shielding enclosure.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
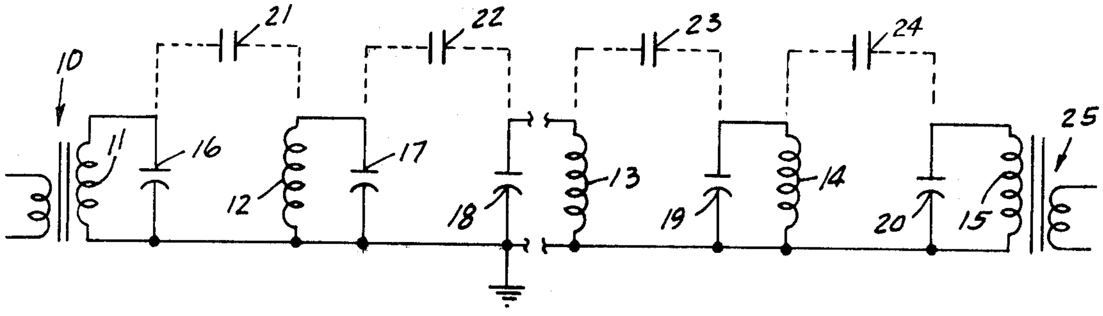
FIG. 1 is an electrical circuit diagram of a multipole filter arrangement employing the improvements of the present invention.

In the circuit diagram of FIG. 1, reference numeral 10 indicates generally an input transformer which supplies an intermediate frequency signal from a preceding stage into the filter assembly shown in FIG. 1. The assembly may consist of any number of individual stages or poles, as indicated by the break in the middle of the third stage. Each stage includes an inductance 11, 12, 13, 14 and 15, respectively, associated with a capacitance 16, 17, 18, 19 and 20, respectively. The inductance and its associated capacitor have values such that they provide a tuned circuit at a predetermined resonant frequency.

Coupling between the individual stages is accomplished almost entirely by the stray capacitances between each of the stages, these stray capacitances being represented schematically at reference numerals 21, 22, 23 and 24, respectively. The intermediate frequency signal passing through the filter is then coupled to succeeding stages as by means of an output transformer 25.

Figure 2:
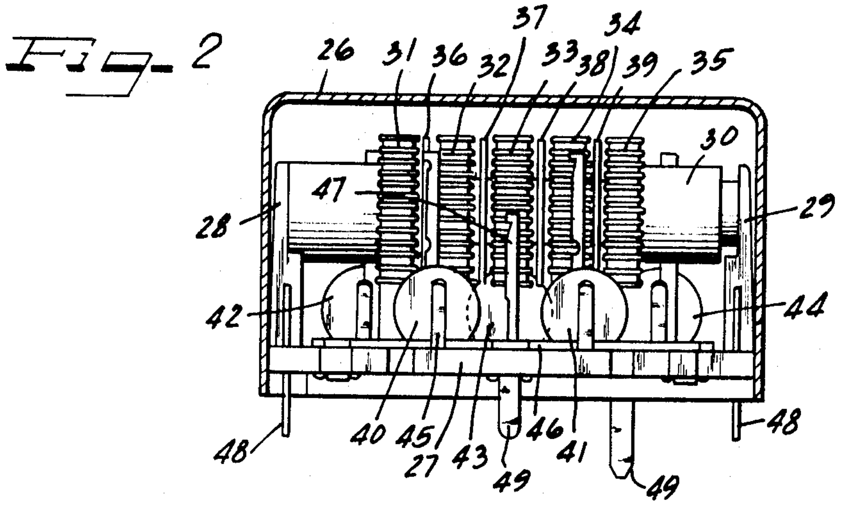
FIG. 2 is a front elevational view, partly in cross section, of the structure involved, with the connecting leads being removed for purposes of clarity.
Figure 3:
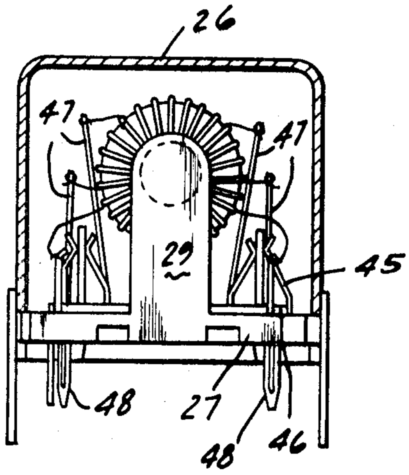
FIG. 3 is a side elevational view, partly in cross section, of the assembly shown in FIG. 2.

In FIGS. 2 and 3, there is shown a five-pole filter of the type with which the present invention is concerned. The filter includes a magnetically shielding outer enclosure 26 which is in tight frictional engagement with a base 27 composed of an insulating, nonmagnetic material such as a synthetic resin. Extending in spaced parallel relation from the base 27 are a pair of vertical support arms 28 and 29 also composed of a nonmagnetic, insulating material. Extending between the support arms 28 and 29 is a cylindrical coil form 30 likewise composed of a nonmagnetic, electrically insulating material such as a synthetic resin.

Mounted in coaxial relation and in closely spaced relation along the coil form 30 are a plurality of toroidal coils 31, 32, 33, 34 and 35. Each of the coils 31 to 35, inclusive, consists of a toroid core composed of a high "Q" material such as a ferrite or powdered iron. The windings on each of the cores, of course, are appropriate to the inductance sought to be achieved in each stage of the filter array. Toroidal cores have the advantage that they have virtually no external magnetic field and are not substantially influenced by stray magnetic fields. Disposed intermediate the coils 31 to 35, inclusive, are electrically insulating, nonmagnetic spacer washers 36, 37, 38 and 39 which may suitably be composed of a material such as polypropylene. The presence of the spacers facilitates assembly and makes manufacturing tolerances less critical.

The capacitive elements of the circuit are provided by a series of disc capacitors 40, 41, 42, 43 and 44, two of the capacitors being located on one side of the coil form 30 and the other three being located on the opposite side. The disc capacitors are received in suitable slots formed in the base 27. Each of the disc capacitors has associated with it a lug 45 which is part of a grounding strap 46 to provide a common ground for the various tuned circuits of the filter. Connections between the inductance element and the capacitance element of each filter stage are provided by including terminals 47 to which the connecting wires are secured as shown in FIG. 3. Lugs 48 are provided to secure the filter array to the external circuitry, and stakes 49 are provided to secure the base 27 more securely to the can 26.

As evident from the foregoing, no electrical connections are required between the individual coils in succeeding stages of the filter, since stray capacitance between the coils is sufficient to insure adequate coupling.

A five-pole filter element of the type described previously was made up to have a midband frequency of 10.7 megahertz. Filter assemblies of this type were found to have an insertion loss which was consistently below 8 db. a bandwidth at 3 db. down of greater than 200 kilohertz, and a bandwidth at 40 db. down of less than 800 kilohertz.

The toroidal filter assembly of the present invention thus provides a compact, self-contained unit which can be easily included within a single magnetic shield at low cost and with greatly improved frequency response characteristics.

We claim as our invention:

1. A filter assembly comprising a magnetically shielding enclosure, a base tightly engaging said enclosure to form a bottom closure therefor, a nonmagnetic coil form supported in spaced relation to said base, a plurality of toroidally wound coils positioned coaxially in closely spaced relation along said coil form, thin nonmagnetic, dielectric spacers substantially filling the spaces between adjacent ones of said coils, and a capacitor connected to each of said coils to form a tuned circuit at a predetermined frequency, said coils being spaced sufficiently close together so that stray capacitances between the coils are sufficient to couple the tuned circuits.

2. The filter assembly of claim 1 which includes support arms extending from said base and engaging the ends of said coil form to hold the same in spaced relation to said base.

3. The filter assembly of claim 1 in which the capacitors are disc-type capacitors arranged in rows on opposite sides of said coil form.

* * * * *